(12) United States Patent
Bocharov et al.

(10) Patent No.: US 8,688,417 B2
(45) Date of Patent: Apr. 1, 2014

(54) DETECTING IMPACT OF EXTRINSIC EVENTS ON A TIME SERIES

(75) Inventors: Alex Bocharov, Redmond, WA (US); Christopher A. Meek, Kirkland, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 13/162,927

(22) Filed: Jun. 17, 2011

(65) Prior Publication Data

US 2012/0323537 A1    Dec. 20, 2012

(51) Int. Cl.
*G06F 17/50* (2006.01)

(52) U.S. Cl.
USPC ........... 703/2; 703/5; 702/36; 398/33; 398/40

(58) Field of Classification Search
USPC .......................... 703/2, 5; 702/36; 398/33, 40
See application file for complete search history.

(56) References Cited

U.S. PATENT DOCUMENTS

| 7,574,019 | B2 | 8/2009 | Mittal et al. | |
| 7,869,967 | B2 | 1/2011 | Marvasti et al. | |
| 2004/0037556 | A1* | 2/2004 | Matz et al. | 398/40 |
| 2004/0126110 | A1* | 7/2004 | Matz et al. | 398/33 |
| 2012/0191373 | A1* | 7/2012 | Soles et al. | 702/36 |
| 2012/0191374 | A1* | 7/2012 | Soles et al. | 702/36 |

OTHER PUBLICATIONS

Kawahara, et al., "Change-Point Detection in Time-Series Data by Direct Density-Ratio Estimation", Retrieved at <<http://www.siam. org/proceedings/datamining/2009/dm09_038_kawaharay.pdf>>, In Proceedings of the SIAM International Conference on Data Mining, 2009, pp. 389-400.

Hirsch, et al., "Selection of Methods for the Detection and Estimation of Trends in Water Quality", Retrieved at <<http://water.usgs.gov/admin/memo/BSA/BSA91.01.pdf>>, Water Resources Research, vol. 27 No. 5, Mar. 15, 1991, pp. 34.

Andersen, et al., "Parametric and Nonparametric Volatility Measurement", Retrieved at <<http://www.ssc.upenn.edu/~fdiebold/papers/paper50/abd071102.pdf>>, Jul. 2002, pp. 68.

Fan, et al., "Nonlinear Time Series: Nonparametric and Parametric Methods", Retrieved at <<http://orfe.princeton.edu/~jqfan/fan/nls/JASA0305.pdf>>, 2003, pp. 348-349.

Brown et al., "Nonparametric smoothing using state space techniques", Retrieved at <<http://citeseerx.ist.psu.edu/viewdoc/download?doi=10.1.1.35.2412&rep=rep1&type=pdf>>, vol. 29 No. 1, 2001, pp. 1-16.

(Continued)

*Primary Examiner* — Thai Phan
(74) *Attorney, Agent, or Firm* — Holly Nguyen; Carole Boelitz; Micky Minhas

(57) ABSTRACT

In one embodiment, an event impact signature detector may analyze a time series with external events. A data interface 250 may receive a data set 310 representing the time series with external events. A processor 220 may fit the data set 310 into a baseline time series model 330. The processor 220 may iteratively determine each event location 352 for multiple external events 350 affecting the baseline time series model 330. The processor 220 may iteratively solve for each event impact 354 of the multiple external events 350 factoring in interactions between the multiple external events 350.

20 Claims, 7 Drawing Sheets

(56) References Cited

OTHER PUBLICATIONS

Jong et al., "Diagnosing Shocks in Time Series", Retrieved at <<http://stats.lse.ac.uk/penzer/papers/diagshoc.pdf>>, Journal of the American Statistical Association, vol. 93, Aug. 11, 2000, pp. 1-36.

Penzer, Jeremy, "State Space Models for Time Series with Patches of Unusual Observations", retrieved at <<http://stats.lse.ac.uk/penzer/papers/PenzerPutKln.pdf>>, Journal of Time Series Analysis, vol. 28 No. 5, Oct. 27, 2006, pp. 23.

Durbin, et al., "Testing for Serial Correlation in Least Squares Regression. II", 1951, pp. 159-178.

Morris, et al., "A Kalman Filter Approach to the Forecasting of Monthly Time Series Affected by Moving Festivals", Journal of Time Series Analysis vol. 5. No. 4, 1984, pp. 255-268.

Harvey, et al., "Messy Time Series: A Unified Approach", Advances in Econometrics, vol. 13, 1998, pp. 103-143.

Durbin, et al., "Time Series Analysis by State Space Methods," 2001, pp. 230-240.

Hyndman, et al., "Forecasting With Exponential Smoothing (The State Space Approach)" 2008, pp. 137-148.

* cited by examiner

400

450

700

DETECTING IMPACT OF EXTRINSIC EVENTS ON A TIME SERIES

BACKGROUND

A process may generate an observable time series that may be modeled as a stochastic process. A stochastic process describes a random process that factors in a probability distribution. The process may be viewed as a base process affected by certain extrinsic events. These events may impact the observed time series values in multiple ways. Yet, the nature of the events or the mechanism by which the events affect the series may not be immediately measurable or known.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to an event impact signature detector may analyze a time series impacted by extrinsic events. A data interface may receive a data set representing the time series with external events. A processor may fit the data set into a baseline time series model. The processor may iteratively determine each event location for multiple external events affecting the baseline time series model. The processor may iteratively solve for each event impact of the multiple external events factoring in interactions between the multiple external events.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 4A:
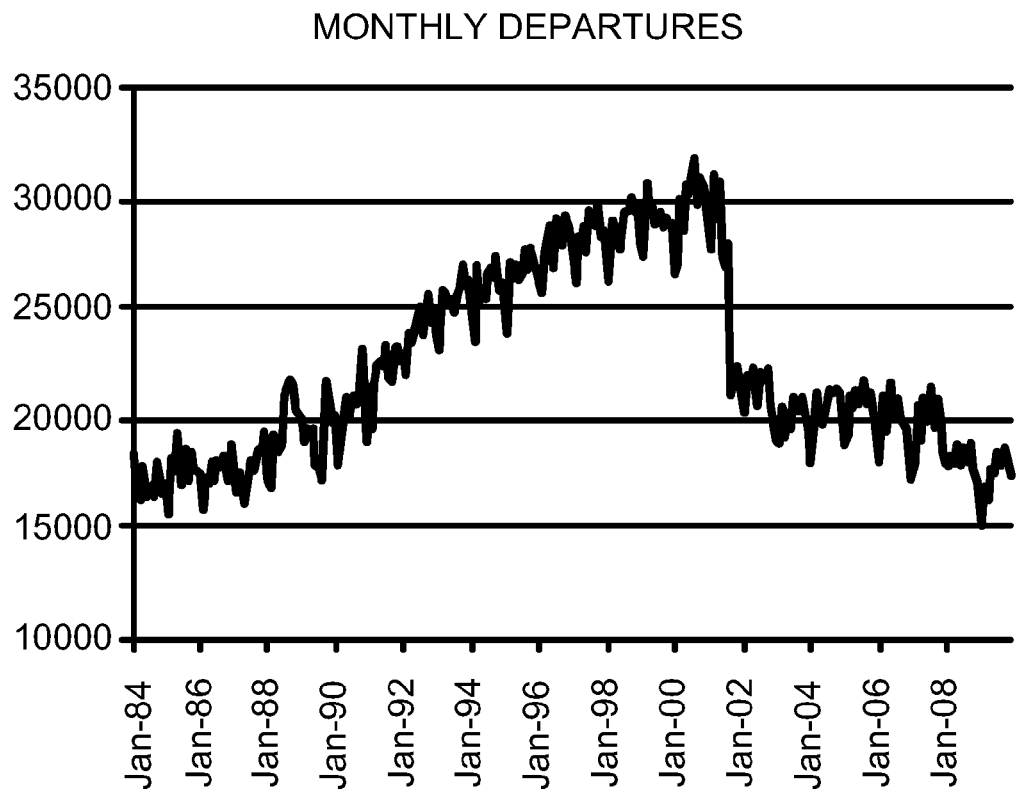
Figure 4B:
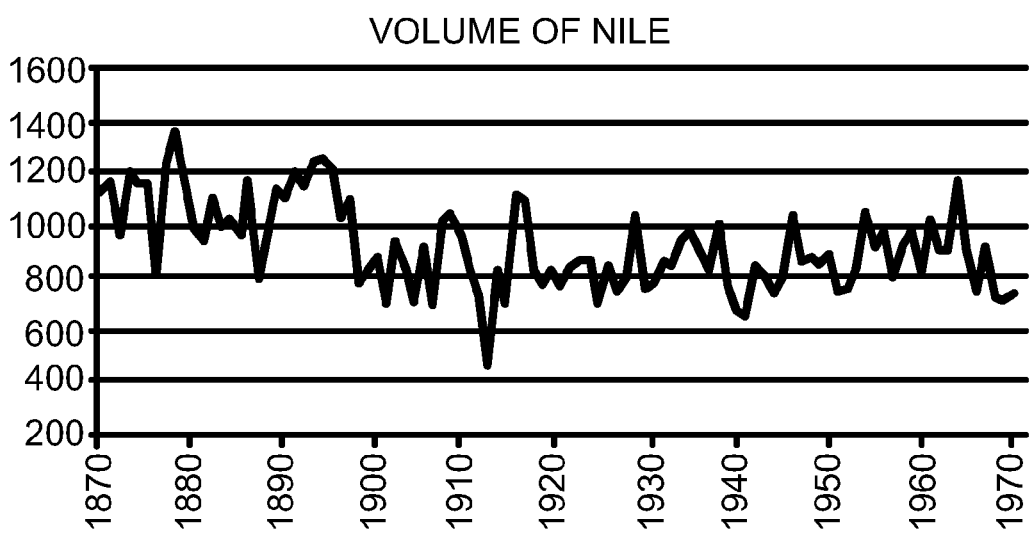

FIGS. 4a-b illustrate, in a graph, embodiments of a time series event.

Figure 5:
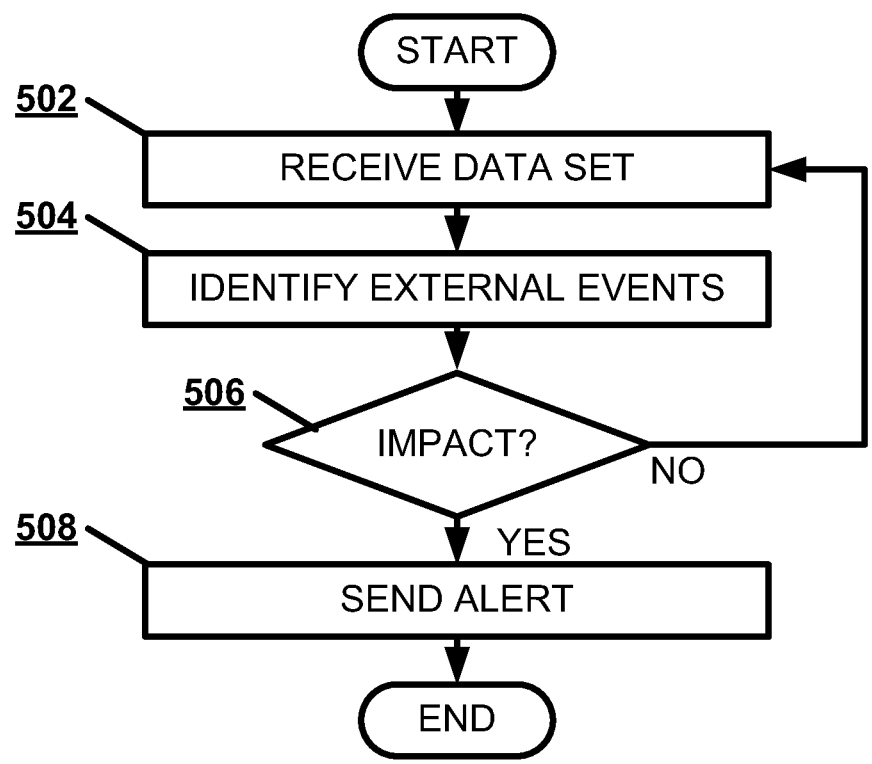

FIG. 5 illustrates, in a flowchart, one embodiment of a method for monitoring for an external event.

Figure 6:
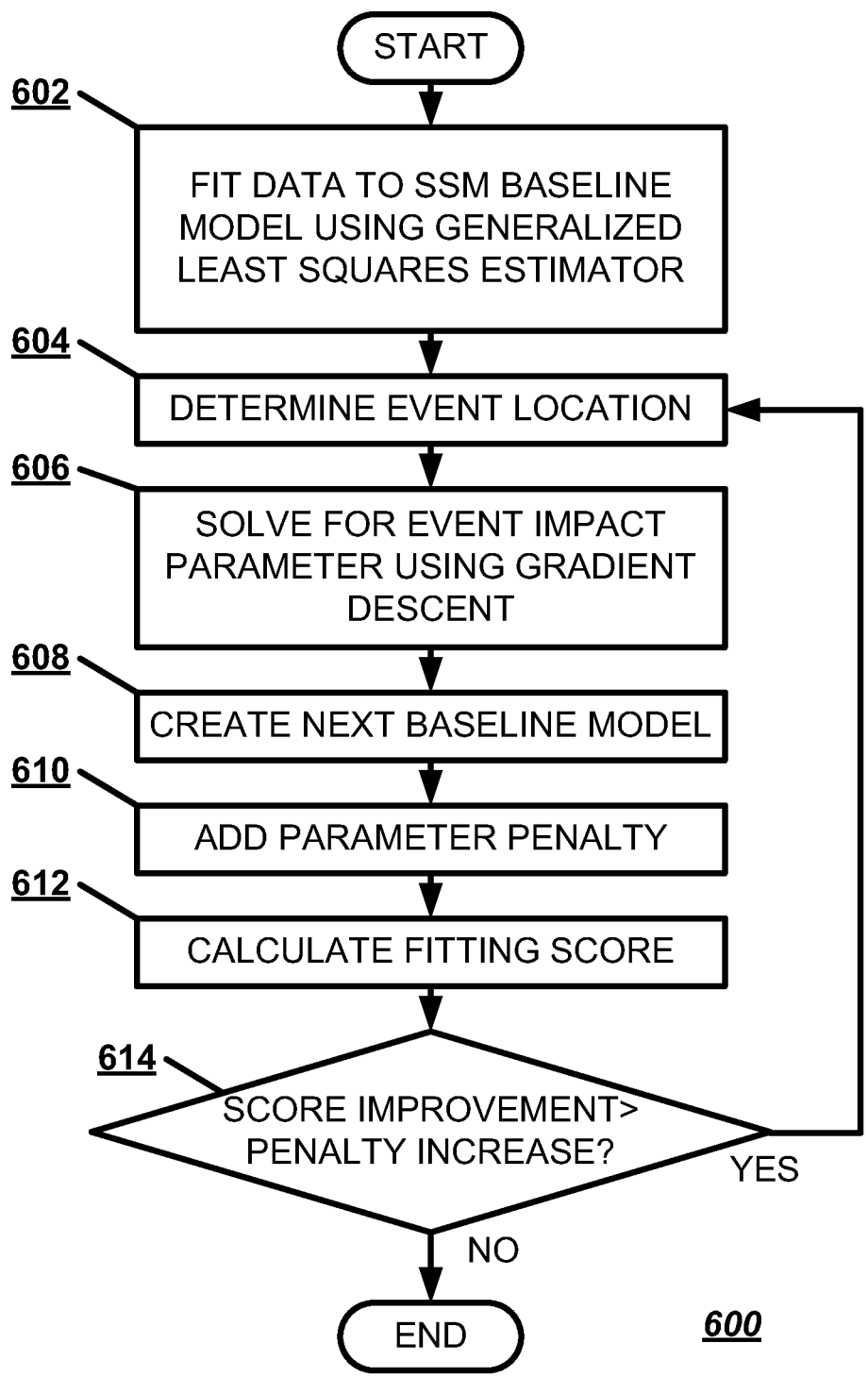

FIG. 6 illustrates, in a flowchart, one embodiment of a method for detecting an external event.

Figure 7:
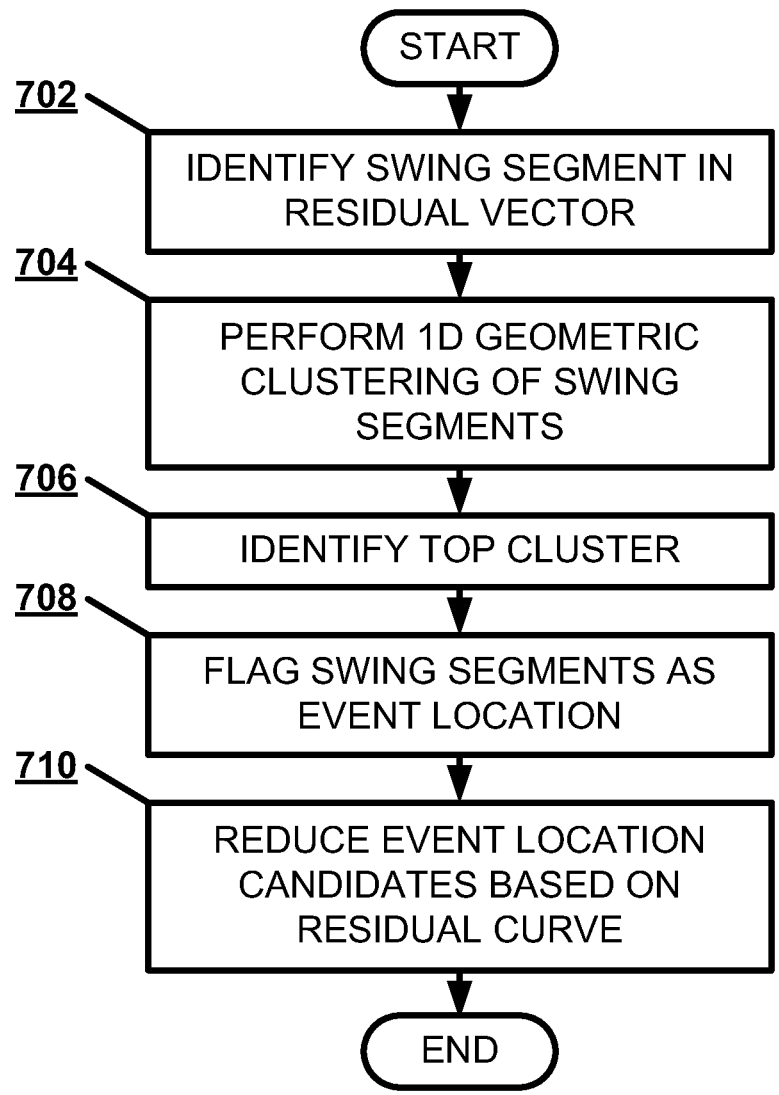

FIG. 7 illustrates, in a flowchart, one embodiment of a method for locating an external event.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an event impact signature detector for a computing device.

An event impact signature detector may examine a data set representing a time series with external events to determine if one or more external events have affected the baseline time series. An external event is an event outside the process producing the baseline time series. The event impact signature detector may use an iterative process to identify the event location and the event impact for each external event. The event location is the time at which the external event happens. The event impact is the degree of movement off the baseline process producing the time series with external events.

The event impact signature detector may use a state space model as the base and a type of kernel regression to describe the events impact. A state space model is a mathematical model of a physical system as a set of inputs, outputs, and state variables related by first-order discrete time equations known as the measurement equation and the state equation. The event impact signature detector may iteratively search for the external events, stopping the iterations based on a Bayesian information criterion (BIC). A Bayesian information criterion is a criterion for model selection among a class of parametric models which trades off how well the model fits the data with a penalty based on the number of parameters in the model.

Thus, in one embodiment, an event impact signature detector may analyze a time series with external events. A data interface may receive a data set representing the time series with external events. A processor may fit the data set into a baseline time series model. The processor may iteratively determine each event location for multiple external events affecting the baseline time series. The processor may iteratively solve for each event impact of the multiple external events factoring in interactions between the multiple external events.

Figure 1:
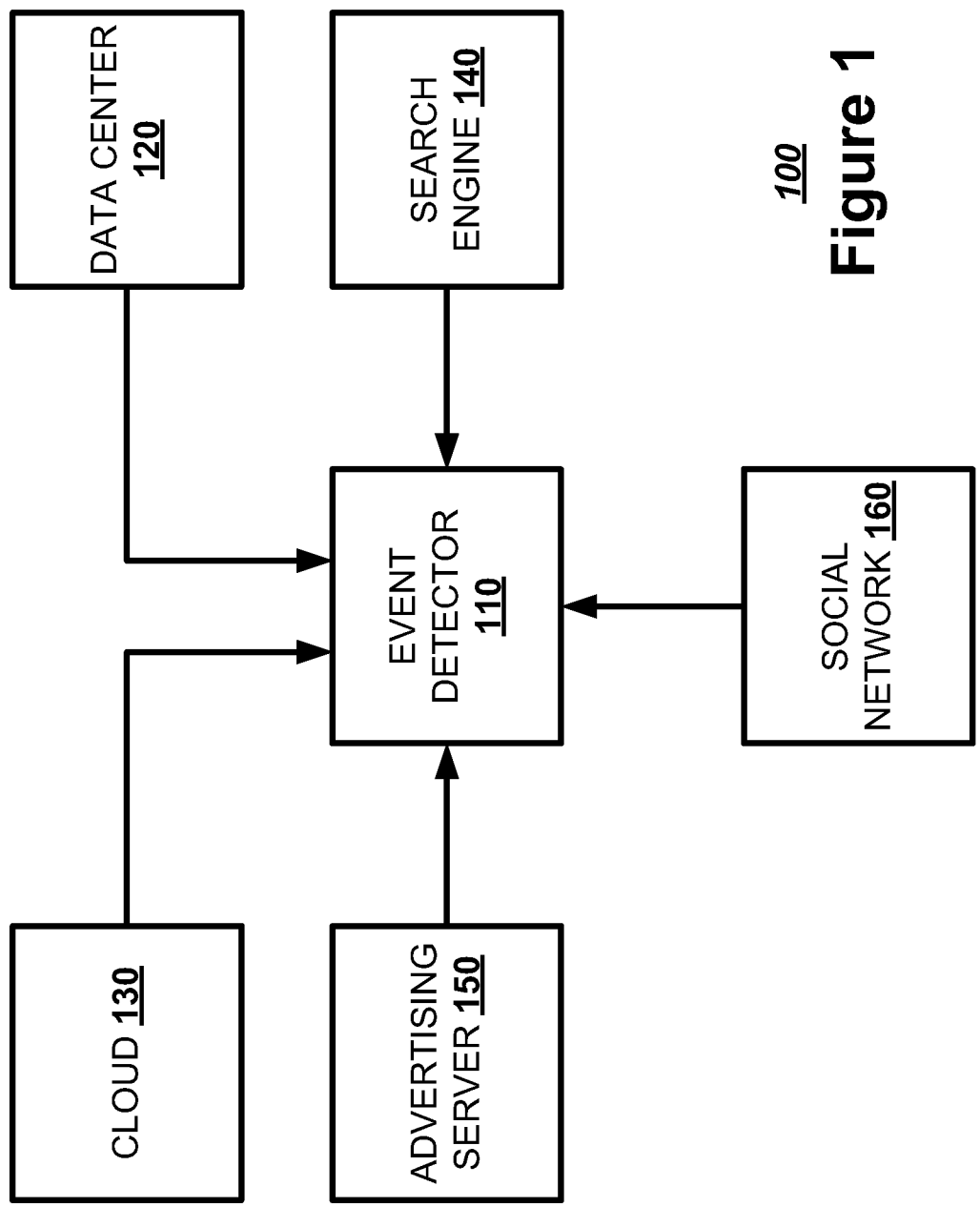
FIG. 1 illustrates, in a block diagram, one embodiment incorporating multiple data aggregation systems.

FIG. 1 illustrates, in a block diagram, one embodiment of a system 100 incorporating multiple data aggregation systems. The system 100 may funnel a data set representing a time series with external events from a variety of sources to an event impact signature detector 110. The event impact signature detector 110 is an application that reviews the time series with external events looking for any external events that may affect the baseline time series model. An event impact signature detector 110 may be tailored to analyze a specific data aggregation system.

A data center 120 or a cloud computing infrastructure 130 may send a data storage metrics set to the event impact signature detector 110. The data center 120 or the cloud computing infrastructure 130 may execute active management based on diverse performance and data quality metrics that effectively comprise time series data. Unusual, deviant, or critical patterns in this data may reflect unusual, deviant, and critical events within the infrastructures. The event impact signature detector 110 may generate real time alerts about such events and provide post-mortem analysis of specific infrastructure incidents.

A search engine 140 may send a web search indices set to the event impact signature detector 110. Current search techniques for computing search relevance may miss out on temporal evolution of the web. The event impact signature detector 110 may execute targeted refreshes of search indices based on unusual and deviant viewer activity over certain groups of search queries or web page groups.

An advertising server 150 may send a viewer traffic pattern set to the event impact signature detector 110. An online advertising revenue model may be based on selling future ad capacity which in turn is directly related to view traffic. Unusual and deviant viewer traffic patterns may present both a problem and opportunity. Such patterns in historical data may distort forecasts of future viewer traffic. The event impact signature detector 110 may detect and mitigate these patterns. The event impact signature detector 110 may also collect sufficient statistics regarding these patterns and anticipating future traffic deviations. The event impact signature detector 110 may anticipate future traffic bursts that the advertising server 150 may use to sell advertising space.

A social network server 160 may send a social network traffic pattern set to the event impact signature detector 110. While business and commerce on social networks are a burgeoning industry, most social network traffic may be generic noise. The event impact signature detector 110 may detect unusual temporal changes in traffic patterns within certain categories, user groups, or account groups that may be either harmful or beneficial for businesses. For example, the event impact signature detector 110 may detect spammer or "bot" attacks or the emergence of viral topics that may be exploited for profit.

The event impact signature detector 110 may be implemented as a function of a separate application. For example, the event impact signature detector 110 may be adopted as one of the core analysis services features for a structure query language (SQL) server to analyze data evolving over time. Alternately, the event impact signature detector 110 may be adopted as a core spreadsheet feature for a spreadsheet application to analyze data evolving over time. The separate application may use the event impact signature detector 110 to analyze a data set representing a time series with external events.

Figure 2:
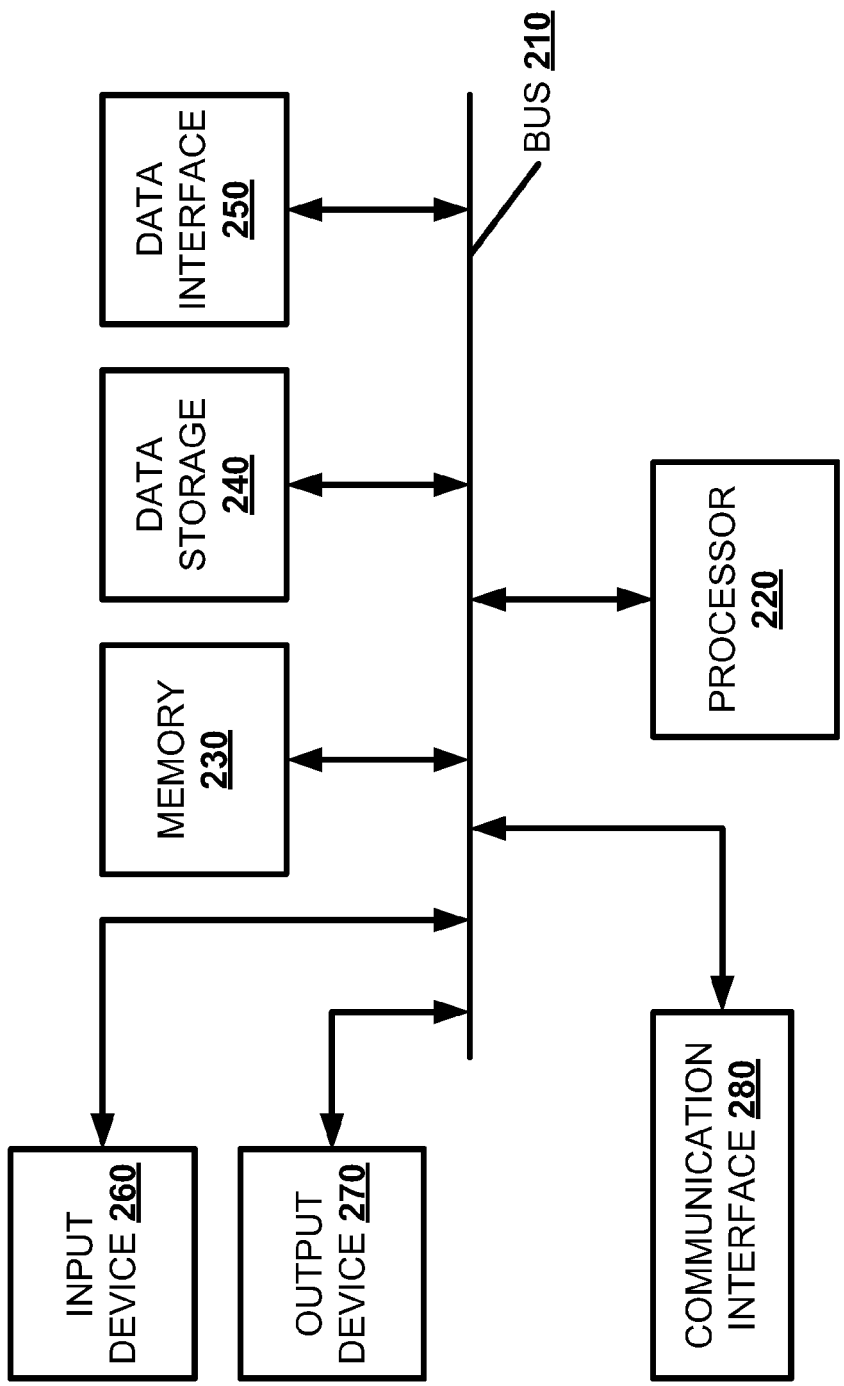
FIG. 2 illustrates, in a block diagram, one embodiment of an exemplary computing device.

FIG. 2 illustrates a block diagram of an exemplary computing device 200 which may act as an event impact signature detector 110. The computing device 200 may combine one or more of hardware, software, firmware, and system-on-a-chip technology to analyze a time series with external events. The computing device 200 may include a bus 210, a processor 220, a memory 230, a storage device 240, a data interface 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The storage device 240 may include any type of tangible machine-readable medium, such as, for example, magnetic or optical recording media and its corresponding drive. The storage device 240 may store a set of instructions detailing a method that when executed by one or more processors cause the one or more processors to perform the method. The storage device 240 may also be a database or a database interface for storing a data set. The data interface 250 may receives a data set representing an observable time series.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables processing device 200 to communicate with other devices or networks. The communication interface 280 may include a network interface or a mobile transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 240, or from a separate device via the communication interface 280.

Figure 3:
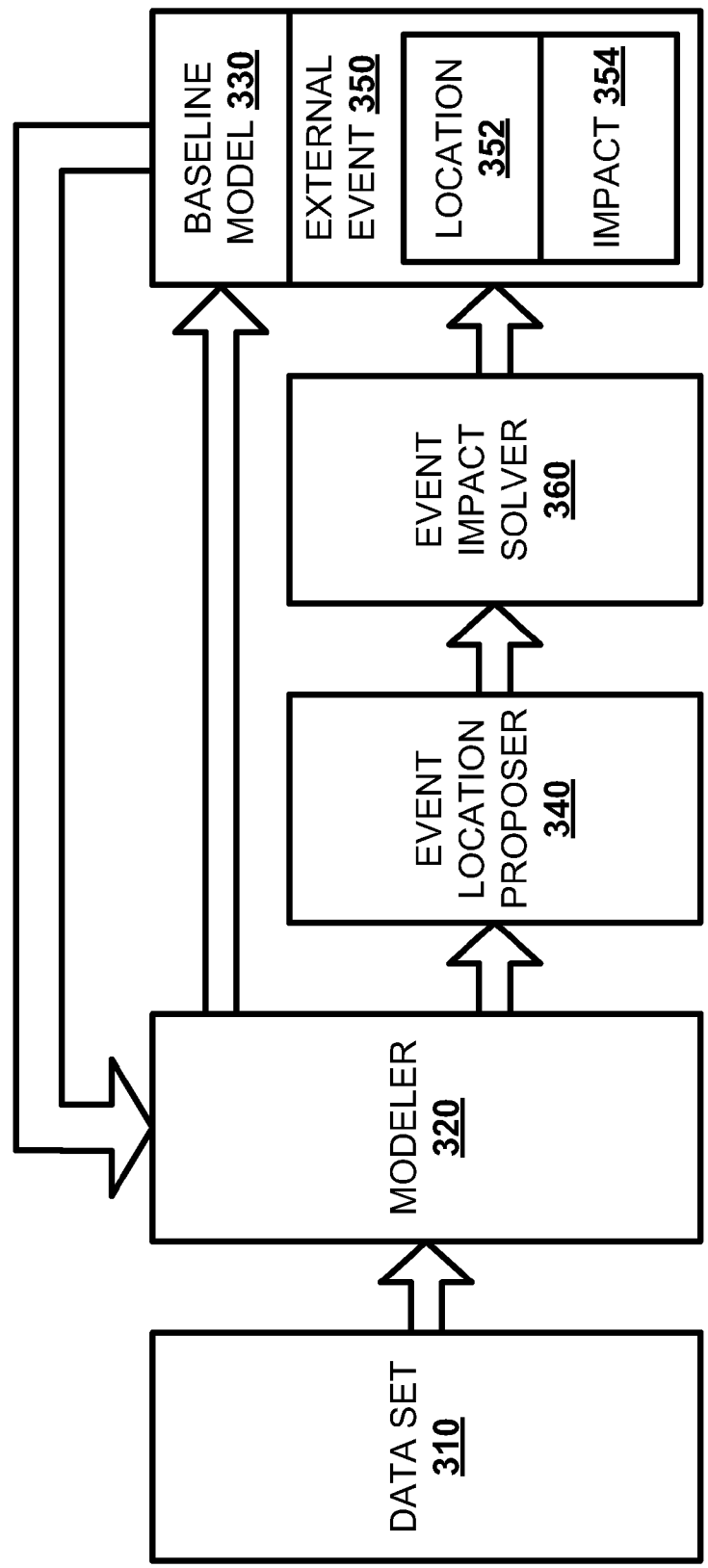
FIG. 3 illustrates, in a block diagram, one embodiment of an event impact signature detector.

FIG. 3 illustrates one embodiment of a data flow 300 of an event impact signature detector 110. The event impact signature detector 110 may receive a data set 310 representing a baseline time series affected by extrinsic events from a variety of sources or obtain the data set from memory. For example, the event impact signature detector 110 may receive a data storage metrics set from data center 120. A modeler 320 may fit the data set 310 into a baseline time series model 330. The baseline time series model 330 may be a state space model. The baseline time series model may be derived assuming either Gaussian or non-Gaussian error distribution. Given a discrete-time time series with observed values represented by $y_1, \ldots, y_n$, the modeler 320 may consider a space state model that couples observed values with a sequence of m-dimensional internal states $X_0, X_1, \ldots, X_n$ as per the observation equation:

$$y_t = W(\theta)X_{t-1} + \epsilon$$

and the state equation:

$$X_t = F(\theta)X_{t-1} + G(\theta)\epsilon, t=1, \ldots, n,$$

where $\theta$ is a vector of the model parameters and $\epsilon$ is the error vector. The modeler 320 may build a specific state space model for a time series $y_1, \ldots, y_n$ by selecting a structure for the operators $W(\theta)$, $F(\theta)$, and $G(\theta)$ and estimating optimal parameters $\theta$ and an optimal initial state $X_0$.

The modeler 320 may include external events by creating an impacted observation equation to read:

$$y_t = W(\theta)X_{t-1} + \mu_t + \epsilon$$

and an impacted state equation to read:

$$X_t = F(\theta)X_{t-1} + \chi_t + G(\theta)\epsilon, t=1, \ldots, n,$$

where $\mu_t$ are measurement shocks directly impacting the measured time series values and $\chi_t$ are state shocks, each affecting the future behavior of the model as per the state transition recursion. The event impact signature detector 110 may penalize the model for each non-zero shock according to the number of parameters used in the description, rather than imposing any parametric "sparseness threshold" on the shock sequences $\mu_t$ and $\chi_t$.

An event location proposer 340 may determine for multiple external events 350 affecting the baseline time series model 330 each event locations 352. The equation $\epsilon_t = \hat{y}_t - y_t$ may denote the residual error at time t measured as the difference between the value predicted by the model $\hat{y}_t$ and the actual value $y_t$. The event location proposer 340 may look at all sign changes for neighboring residual errors of the model with respect to time along with all the local extrema, measured as sign changes of the differences between neighboring residuals. The residual vectors of the observation model and the state model may identify any two neighboring sign change points as a swing segment and a potential domain of an event signature. Variables $\epsilon_{t_1-1}$ and $\epsilon_{t_2+1}$ may represent any two neighboring sign change points, such as $\epsilon_{t_1-1}*\epsilon_{t_1}<0$, $\epsilon_{t_2}+1*\epsilon_{t_2}<0$, $\epsilon_{t}*\epsilon_{t_1}>0$, and $t_1 \leq t \leq t_2$. The variable $t_1$ may equal $t_2$, particularly in the case of a single measurement spike. The variable $t_3>t_2$ may be the location of the nearest local extreme on the right of the $t_2$. Any such half-segment from $t_1$ to $t_3$ may be a swing segment and a potential domain of an event signature. The variable $t_3$ may equal n+1 when the residuals trend monotonically from $t_2$ through the end of the data.

The event location proposer 340 may set a priority list of segments based on the residual impact, where $$\text{Impact}([t_1,t_3])=\Sigma_{t=t_1}^{t_3-1}\epsilon_t^2.$$

The event location proposer 340 may flag swing segments with high impact as event location candidates. The event location proposer 340 may perform one-dimensional geometric clustering of the swing segments by the impact feature, then may flag all the segments in the top cluster as event location candidates. The event location proposer 340 may reduce the event signature candidates. Note that if a swing segment is short enough, the residual vector may be handily represented as a sequence of measurement shocks at locations. For longer segments, a residual vector may use a smaller set of candidate locations in the observation equation. The event location proposer 340 may reduce event location candidates based on an approximation of the residual curve by either stepwise constant curve or by a stepwise linear curve. The event location proposer 340 may greedily remove one of the internal points and bridge the segment between the left and right neighbor with an approximating curve, either with a constant step or with a linear segment. The approximating curve may now be represented as a sequence of state shocks in the state equation. The removal of the point may reduce the number of parameters in the composite model. The event location proposer 340 may apply the Bayesian information criterion to determine when to stop the iterations.

An event impact solver 360 may solve for the multiple external events 350 each event impact 354 factoring in interactions between the multiple external events 350. The residuals vector may be represented as $$\epsilon=U(\theta)X_0+M(\theta)\mu+K(\theta)\chi+V(\theta).$$

The equation $L=L(\epsilon)$ may represent the loss function for the impacted observation model and the impacted state model. For a given $\theta$ in the $\theta$ parameters domain, the equation:

$$\nabla_\epsilon L(\epsilon)U(\theta)=0, \nabla_\epsilon L(\epsilon)M(\theta)=0, \nabla_\epsilon L(\epsilon)K(\theta)=0$$

may be solved for $X_0$, $\mu$, and $\chi$. Solutions of these equations may represent the optimal estimate for $X_0$, $\mu x$, and $\chi$ for a given $\theta$. Such optimal estimates may be represented by $\widehat{X_0(\theta)}$, $\widehat{\mu(\theta)}$, $\widehat{\chi(\theta)}$. The event impact solver 360 may reduce the minimization task to minimization in $\theta$ parameters domain. The event impact solver 360 may avoid the complications of computing the gradients of $\widehat{X_0(\theta)}$, $\widehat{\mu(\theta)}$, $\widehat{\chi(\theta)}$ in order to know the gradient of $\hat{L}(\theta)$.

The baseline time series model 330 may be iterated through the event impact signature detector 110 multiple times to determine an event location 352 and an event impact 354 of an external event 350 affecting the baseline time series model 330. The event impact signature detector 110 may create a next iteration baseline time series model 330 by combining the baseline time series model 330 with the external event 350. The event impact signature detector 110 may iterate through determining a next event location 352 and a next event impact 354 of a next external event 350 affecting the next iteration baseline time series model 330.

For example, FIG. 4a illustrates, in a graph, the monthly air passenger departures 300 from 1984 to 2007. The first iteration of this time series with external events may identify a shock of the magnitude of −6338 at an August 2001 data point. The next iteration of algorithm may identify a July/August 1989 traffic drop against the seasonal expectations and a downward local trend adjustment leading into September 2001. The latter may reflect actual June, July and August 2001 drop in traffic against seasonal expectations of approximately 10%, 12% and 12% respectively.

In a further example, FIG. 4b illustrates, in a graph, the volume 350 of the Nile River from 1874 to the 1970. Intuitively the data plot may show a 9-year burst starting in year 1890 and 6-year dip starting in 1910. The event location proposer 340 may identify both on the first iteration, representing each as sequence of local trend interventions. However, the event impact signature detector 110 may use a minimum of 6 parameters to describe each signature, rendering prohibitive incorporating either in terms of the Bayesian information criterion. Thus the model may be better off ignoring both event signatures as handling either causes overfitting.

FIG. 5 illustrates, in a flowchart, one embodiment of a method 500 for monitoring for an external event. The event impact signature detector 110 may receive a data set representing a time series with external events from a data source (Block 502). The data source may be a data center 120, a cloud data infrastructure 130, a search engine 140, an advertising server 150, a social network 160, a data interface 250, a local data storage 240, or other sources. The data set may be a data storage metrics set, a web search indices set, a viewer traffic pattern set, or a social network traffic pattern set. The event impact signature detector 110 may identify one or more external events affecting the baseline time series for the data set (Block 504). If the cumulative event impact reaches an impact threshold (Block 506), the event impact signature detector 110 may send a real time alert to an administrator of the data source via the communication interface 280 (Block 508).

FIG. 6 illustrates, in a flowchart, one embodiment of a method 600 for detecting external events. The event impact signature detector 110 may fit a data set representing the time series with external events into a state space model (SSM) baseline time series model 330 (Block 602). The event impact signature detector 110 may solve for an initial state of the baseline time series model 330 using a generalized least squares estimator. The event impact signature detector 110 may execute a location operation to determine event location 352 of an external event 350 that impacts the time series with external events (Block 604). The event impact signature detector 110 may execute an impact operation to solve for an estimated event impact 354 of the external event 350 on the time series with external events (Block 606). The event impact signature detector 110 may determine an event impact parameter of the baseline time series model 330 using a gradient descent. The event impact signature detector 110 may execute an incrementing operation to create a next iteration baseline time series model 330 by combining the baseline time series model 330 with the external event 350 (Block 608). The event impact signature detector 110 may add a parameter penalty for each new parameter added to the next iteration baseline time series model (Block 610). The event impact signature detector 110 may calculate a fitting score for the next iteration baseline time series model 330 (Block 612). If an improvement of the fitting score exceeds an increase of the parameter penalty (Block 614), the event impact signature detector 110 may iterate the next iteration baseline time series model through the location operation (Block 604), the impact operation (Block 606), and the incrementing operation (Block 608) to determine a next event location and a next event impact of a next proposed external event affecting the next iteration baseline time series model. If an increase of the parameter penalty negates an improvement of the fitting score (Block 614), the event impact signature detector 110 may stop iterations.

Thus, the event impact signature detector 110 may iteratively determine each event location for multiple external events affecting the time series with external events. Additionally, the event impact signature detector 110 may iteratively solve for an estimated event impact of each event in the multiple external events factoring in interactions between the multiple external events.

FIG. 7 illustrates, in a flowchart, one embodiment of a method 700 for locating an external event. The event impact signature detector 110 may use a residual vector of the baseline time series model to propose an event location candidate. The event impact signature detector 110 may identify a segment bounded by a residual sign change point and a residual extrema as a swing segment in a residual vector (Block 702). The event impact signature detector 110 may perform one dimensional geometric clustering of a set of swing segments (Block 704). The event impact signature detector 110 may identify a top cluster (Block 706). The event impact signature detector 110 may flag a swing segment of the top cluster as an event location candidate (Block 708). The event impact signature detector 110 may reduce event location candidates by modeling an event location candidate based on an approximation of the residual curve (Block 710).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for analyzing a time series with external events, comprising:
    fitting a data set representing the time series with external events to a baseline time series model;
    determining each event location for multiple external events affecting the time series with external events; and
    solving for an estimated event impact of each event in the multiple external events factoring in interactions between the multiple external events.

2. The method of claim 1, further comprising:
    creating the baseline time series model as a state space model.

3. The method of claim 1, further comprising:
    determining an event location and an estimated event impact of each external event affecting the baseline time series model;
    creating a next iteration baseline time series model by combining the baseline time series model with the estimated event impact; and
    iterating through determining a next event location and a next event impact of a next proposed external event affecting the next iteration baseline time series model.

4. The method of claim 3, further comprising:
    adding a parameter penalty for each new parameter added to the next iteration baseline time series model;
    calculating a fitting score for the next iteration baseline time series model; and
    stopping iterations when an increase of the parameter penalty negates an improvement of the fitting score.

5. The method of claim 1, further comprising:
    solving for an initial state of the baseline time series model using a generalized least squares estimator.

6. The method of claim 1, further comprising:
    determining an event impact parameter of the baseline time series model using a gradient descent.

7. The method of claim 1, further comprising:
    using a residual vector of the baseline time series model to propose an event location candidate.

8. The method of claim 1, further comprising:
identifying a segment bounded by a residual sign change point and a residual extrema as a swing segment in a residual vector.

9. The method of claim 1, further comprising:
performing one dimensional geometric clustering of a set of swing segments.

10. The method of claim 9, further comprising:
identifying a top cluster;
flagging a swing segment of the top cluster as an event location candidate.

11. The method of claim 1, further comprising:
modeling event location candidates based on an approximation of a residual curve.

12. The method of claim 1, wherein the data set is at least one of data storage metrics set, web search indices set, viewer traffic pattern set, and a social network traffic pattern set.

13. A non-transitory tangible machine-readable storage medium having a set of instructions detailing a method stored thereon that when executed by one or more processors cause the one or more processors to perform the method, the method comprising:
fitting a data set representing a time series with external events to a baseline time series model;
executing a location operation to determine an event location of an external event that impacts the time series with external events;
executing an impact operation to solve for an estimated event impact of the external event;
executing an incrementing operation to create a next iteration baseline time series model by combining the baseline time series model with the estimated event impact; and
iterating the next iteration baseline time series model through the location operation, the impact operation, and the incrementing operation to determine a next event location and a next event impact of a next proposed external event.

14. The tangible machine-readable storage medium of claim 13, wherein the method further comprises:
adding a parameter penalty for each new parameter added to the next iteration baseline time series model;
calculating a fitting score for the next iteration baseline time series model; and
stopping iterations when an increase of the parameter penalty negates an improvement of the fitting score.

15. The tangible machine-readable storage medium of claim 13, wherein the method further comprises:
solving for an initial state of the baseline time series model using a generalized least squares estimator.

16. The tangible machine-readable storage medium of claim 13, wherein the method further comprises:
determining an event impact parameter of the baseline time series model using a gradient descent.

17. The tangible machine-readable storage medium of claim 13, wherein the method further comprises:
using a residual vector of the baseline time series model to propose an event location candidate.

18. The tangible machine-readable storage medium of claim 13, wherein the method further comprises:
modeling event location candidates based on an approximation of a residual curve.

19. An event impact signature detector, comprising:
a data interface that receives data storage metrics set from a data center;
a processor that fits the data storage metrics set to a baseline time series model, iteratively determines each event location of multiple external events affecting the data storage metrics, and iteratively solves for each event impact of the multiple external events factoring in interactions between the multiple external events.

20. The event impact signature detector of claim 19, further comprising:
a communication interface to send a real time alert to the data center when a cumulative event impact reaches an impact threshold.

* * * * *